US008719905B2

(12) United States Patent  
Ganesan

(10) Patent No.: US 8,719,905 B2  
(45) Date of Patent: May 6, 2014

(54) SECURE AND EFFICIENT LOGIN AND TRANSACTION AUTHENTICATION USING IPHONES™ AND OTHER SMART MOBILE COMMUNICATION DEVICES

(75) Inventor: Ravi Ganesan, West Palm Beach, FL (US)

(73) Assignee: Authentify Inc., Chicago, IL (US)

( * ) Notice: Subject to any disclaimer, the term of this patent is extended or adjusted under 35 U.S.C. 154(b) by 290 days.

(21) Appl. No.: 13/081,067

(22) Filed: Apr. 6, 2011

(65) Prior Publication Data

US 2011/0265149 A1    Oct. 27, 2011

Related U.S. Application Data

(60) Provisional application No. 61/327,723, filed on Apr. 26, 2010.

(51) Int. Cl.  
    *G06F 15/16*      (2006.01)

(52) U.S. Cl.  
    USPC .................. 726/4; 726/5; 726/6; 719/328

(58) Field of Classification Search  
    USPC ............ 713/184; 719/328; 705/44; 726/4–12  
    See application file for complete search history.

(56) References Cited

U.S. PATENT DOCUMENTS

| | | | |
|---|---|---|---|
| 5,671,354 | A | 9/1997 | Ito et al. |
| 8,136,148 | B1 | 3/2012 | Chayanam et al. |
| 2002/0095507 | A1 | 7/2002 | Jerdonek |
| 2003/0028451 | A1 | 2/2003 | Ananian |
| 2003/0055738 | A1 * | 3/2003 | Alie .............................. 705/26 |
| 2004/0019564 | A1 * | 1/2004 | Goldthwaite et al. .......... 705/44 |
| 2004/0030934 | A1 | 2/2004 | Mizoguchi et al. |
| 2004/0093263 | A1 * | 5/2004 | Doraisamy et al. ............. 705/11 |
| 2004/0210536 | A1 | 10/2004 | Gudelj et al. |

(Continued)

FOREIGN PATENT DOCUMENTS

| | | |
|---|---|---|
| JP | 08-235114 A | 9/1996 |
| JP | 11-338933 | 12/1999 |

(Continued)

OTHER PUBLICATIONS

International Search Report/Written Opinion, PCT/US2011/023525, mailed Apr. 5, 2011.

(Continued)

*Primary Examiner* — John Follansbee  
*Assistant Examiner* — Weiwei Stiltner  
(74) *Attorney, Agent, or Firm* — Antonelli, Terry, Stout & Kraus, LLP.

(57) ABSTRACT

To authenticate a user of a mobile communication device for login or transaction authorization, a first application on the device directs transmission of a request for authentication of the user to a security server. A second application on the device receives the request for authentication from the security server and directs presentation of the received request for authentication to the user by the device. The second application receives a user input to the device indicating that the requested authentication should proceed and in response directs transmission of an indication that the requested authorization should proceed, to the security server. In response to this latter transmission, the second application receives a PIN from the authentication server. The first application directs transmission of the PIN received by the second application to the network site, which validates the transmitted PIN, in order to authenticate the user or the transaction to the network site.

18 Claims, 12 Drawing Sheets

(56) References Cited

U.S. PATENT DOCUMENTS

| | | | |
|---|---|---|---|
| 2004/0225878 A1 | 11/2004 | Costa-Requena et al. | |
| 2004/0242238 A1* | 12/2004 | Wang et al. | 455/456.1 |
| 2005/0135242 A1 | 6/2005 | Larsen et al. | |
| 2005/0172229 A1 | 8/2005 | Reno et al. | |
| 2005/0254653 A1 | 11/2005 | Potashnik et al. | |
| 2006/0168259 A1 | 7/2006 | Spilotro | |
| 2006/0168663 A1 | 7/2006 | Viljoen et al. | |
| 2006/0235795 A1 | 10/2006 | Johnson et al. | |
| 2007/0011724 A1* | 1/2007 | Gonzalez et al. | 726/4 |
| 2007/0067828 A1 | 3/2007 | Bychkov | |
| 2007/0074276 A1* | 3/2007 | Harrison et al. | 726/4 |
| 2007/0079135 A1 | 4/2007 | Saito | |
| 2007/0157304 A1* | 7/2007 | Logan et al. | 726/12 |
| 2007/0174904 A1 | 7/2007 | Park | |
| 2007/0186095 A1 | 8/2007 | Ganesan et al. | |
| 2007/0198437 A1 | 8/2007 | Eisner et al. | |
| 2007/0262134 A1* | 11/2007 | Humphrey et al. | 235/379 |
| 2007/0279227 A1 | 12/2007 | Juels | |
| 2007/0283273 A1 | 12/2007 | Woods | |
| 2008/0028447 A1 | 1/2008 | O'Malley et al. | |
| 2008/0034216 A1 | 2/2008 | Law | |
| 2008/0052180 A1 | 2/2008 | Lawhorn | |
| 2008/0109657 A1 | 5/2008 | Bejaj et al. | |
| 2008/0120707 A1 | 5/2008 | Ramia | |
| 2008/0172730 A1 | 7/2008 | Sandhu et al. | |
| 2008/0254765 A1 | 10/2008 | Eliaz | |
| 2009/0031407 A1* | 1/2009 | Kuang | 726/7 |
| 2009/0037983 A1 | 2/2009 | Chiruvolu et al. | |
| 2009/0093300 A1 | 4/2009 | Lutnick et al. | |
| 2009/0119754 A1* | 5/2009 | Schubert | 726/4 |
| 2009/0119776 A1 | 5/2009 | Palnitkar et al. | |
| 2009/0132813 A1 | 5/2009 | Schibuk | |
| 2009/0235339 A1 | 9/2009 | Mennes et al. | |
| 2009/0249076 A1 | 10/2009 | Reed et al. | |
| 2009/0249077 A1 | 10/2009 | Gargaro et al. | |
| 2009/0254572 A1 | 10/2009 | Redlich et al. | |
| 2009/0259588 A1 | 10/2009 | Lindsay | |
| 2009/0259848 A1 | 10/2009 | Williams et al. | |
| 2009/0265768 A1 | 10/2009 | Labaton | |
| 2009/0288159 A1 | 11/2009 | Husemann et al. | |
| 2010/0017860 A1 | 1/2010 | Ishida | |
| 2010/0024022 A1 | 1/2010 | Wells et al. | |
| 2010/0041391 A1 | 2/2010 | Spivey et al. | |
| 2010/0235897 A1 | 9/2010 | Mason et al. | |
| 2010/0262834 A1* | 10/2010 | Freeman et al. | 713/184 |
| 2010/0268831 A1* | 10/2010 | Scott et al. | 709/228 |
| 2011/0153496 A1* | 6/2011 | Royyuru | 705/44 |
| 2011/0161989 A1* | 6/2011 | Russo et al. | 719/328 |
| 2011/0208801 A1 | 8/2011 | Thorkelsson et al. | |
| 2012/0005483 A1 | 1/2012 | Patvarczki et al. | |
| 2012/0124651 A1 | 5/2012 | Ganesan et al. | |

FOREIGN PATENT DOCUMENTS

| | | |
|---|---|---|
| JP | 2002-152195 A | 5/2002 |
| JP | 2002-259344 | 9/2002 |
| JP | 2002-297939 A | 10/2002 |
| JP | 2005-209083 | 8/2005 |
| JP | 2006-48653 A | 2/2006 |
| JP | 2006-236281 A | 9/2006 |
| WO | WO 2007107868 | 9/2007 |

OTHER PUBLICATIONS

International Search Report/Written Opinion, PCT/US2011/022486, mailed Apr. 20, 2011.
International Search Report/Written Opinion, PCT/US2011/023528, mailed Apr. 27, 2011.
International Search Report/Written Opinion, PCT/US2011/032295, mailed Jun. 13, 2011.
International Search Report/Written Opinion, PCT/US2011/032271, mailed Jul. 11, 2011.
PCT International Search Report and Written Opinion issued in International Application No. PCT/US11/22482 on Jan. 26, 2011.
International Search Report and Written Opinion, PCT/US2012/032840, Jun. 20, 2012.
Gralla, P. How the Internet Works, 2006, Que, pp. 346-347.
WOT *online). Against Intuition Inc., 2006 [retrieved on Aug. 24, 2012). Retrieved from the *Internet: URL:web.archive.org/web/20061127233933/http://www.mywot.com/en/wot/help/wot_symbols_explained/, pp. 1-3.
Japanese Office Action issued on Oct. 29, 2013, in corresponding patent application No. 2013-507991.

\* cited by examiner

User Activity Log

| Time (Pacific) | Browsing Activity Log |
|---|---|
| 2010-01-26 19:43:13 | Seal gave "fins up" to merchant.neatsvcs.com |
| 2010-01-26 19:43:22 | Seal gave "fins up" to merchant.neatsvcs.com and one time password provided |
| 2010-01-26 19:43:31 | Seal gave "fins up" to merchant.neatsvcs.com and one time password provided to sign transaction "Pay Alice $40" |
| 2010-01-26 19:43:42 | Seal gave "fins up" to merchant.neatsvcs.com |
| 2010-01-26 19:43:47 | Seal gave "fins up" to merchant.neatsvcs.com and one time password provided |
| 2010-01-26 19:43:57 | Seal gave "fins up" to merchant.neatsvcs.com and one time password provided to sign transaction "Pay Alice $40" |
| 2010-01-26 19:44:06 | Seal gave "fins up" to merchant.neatsvcs.com |
| 2010-01-26 19:44:10 | Seal gave "fins up" to merchant.neatsvcs.com |
| 2010-01-26 19:44:15 | Seal gave "fins up" to merchant.neatsvcs.com |

Figure 3
PRIOR ART

SECURE AND EFFICIENT LOGIN AND TRANSACTION AUTHENTICATION USING IPHONES™ AND OTHER SMART MOBILE COMMUNICATION DEVICES

RELATED APPLICATIONS

This application claims priority based on Provisional U.S. Application Ser. No. 61/327,723, filed Apr. 26, 2010. This application is related to pending Application Ser. No. 12/938,161, filed Nov. 2, 2010 and entitled "A NEW METHOD FOR SECURE SITE AND USER AUTHENTICATION", which claims priority based on Provisional U.S. Application Ser. No. 61/257,207, filed Nov. 2, 2009 and entitled "Project Seal". This application is also related to pending Application Ser. No. 13/006,806, filed Jan. 14, 2011 and entitled "A NEW METHOD FOR SECURE USER AND SITE AUTHENTICATION", which is a continuation of pending Application Ser. No. 12/938,161. This application is also related to pending Application Ser. No. 13/011,587, filed Jan. 21, 2011, and entitled A NEW METHOD FOR SECURE USER AND TRANSACTION AUTHENTICATION AND RISK MANAGEMENT", which claims priority based on Provisional U.S. Application Ser. No. 61/298,551, filed Jan. 27, 2010 and entitled "Authentication-The Game Changer". This application is also related to Application Ser. No. 13/011,739, filed Jan. 21, 2011, and entitled A NEW METHOD FOR SECURE USER AND TRANSACTION AUTHENTICATION AND RISK MANAGEMENT", which is a continuation-in-part of pending Application Ser. No. 13/011,587. The contents of the above identified applications are hereby incorporated herein in their entirety by reference.

TECHNICAL FIELD

This invention relates to security and privacy. More particularly it relates to web based transaction authentication using smart mobile communication devises, such as Apple IPhones™.

BACKGROUND OF THE INVENTION

User authentication using techniques such as passwords, one time passwords (OTPs), hardware or software smart cards, etc., have all proven to be either too weak and susceptible to man in the middle (MITM) or man in the browser (MITB) attacks, or else have proven too cumbersome and expensive. The use of single sign on techniques such as OpenID, FaceBook Connect, etc., only make the problem worse as once the attacker has compromised the master account they can now break into all other accounts that rely on that initial login. Further, the focus of attackers has shifted from trying to break the login process to using sophisticated techniques to come in after the act of login and to attack the transactions being performed. This has made transaction authentication, the act of confirming if the transaction seen at the back end web server is identical to that intended by the user, even more important.

Out of band authentication (OOBA), a technique by which a transaction is relayed to the user, and confirmation obtained, using an alternate form of communication, for instance by placing a voice phone call or a text message, is a promising alternative, but is also to inconvenient and costly to be used very often. It might be useful for the highest value transactions, or rare events like password resets, but using it for large number of transactions is too costly and cumbersome.

In prior work (see the related applications identified above), we described an innovation that addresses some of these problems. Specifically, we introduced the notion of the establishment of a security server that communicates with an independent pop-up window on the user's desktop that is being used to access the website. We described how this security server can alert the user, via communications to the pop-up as to the legitimacy of the web site the user is browsing via their browser. We also described how this pop-up window can provide a user with a one time password to enable login into the web site (i.e. authentication of the user to the website), based on a secret shared between the web site and the security server. Of particular utility in this invention was that it provided the security of one time passwords, but did not require a per user shared secret which all prior one time password systems have required.

It is common when users browse an eCommerce web site for them to see Payment Buttons such as that provided by Paypal. When the user clicks on that payment functionality, the user is typically interacting directly with the payment provider. This means the user does not reveal their credentials, for authenticating to the payment provider, to the eCommerce site. This is an important feature that is no longer available when a user is interacting with the eCommerce site using a smartphone app the site provides.

The innovations described herein further extend our prior work to provide for efficient and secure login authentication and transaction authorization using smart mobile communication devices.

OBJECTIVES OF THE INVENTION

The present invention is directed to providing an improved login and transaction authentication protocol that is easily implemented on smart mobile communication devices such as IPhones and IPads.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to aspects of the present invention is directed to authentication of a user of a mobile communication device, such as an IPhone. To do so, a first application executing on the mobile communication device, such as a merchant or bank ecommerce application, directs transmission, from the mobile communication device to a security server, of a request for authentication of the user in connection with either (i) the user logging into a network site, such as the merchant or the bank Internet site or (ii) the user entering into a transaction with such a network site, such as the purchase of a product from the merchant Internet site or the transfer of funds from the bank Internet site. A second application executing on the mobile communication device, which is commonly referred to as the Hawk and Seal Application but is also often referred to herein as the Authentify Application (AA), receives the request for authentication from the security server. The second application directs presentation by the mobile communication device, e.g. on the IPhone touch screen, of the received request for authentication to the user. The second application then receives a user input to the mobile communication device, e.g. via the IPhone touch screen, indicating that the requested authentication should proceed. The second application, in response to the received user input, directs transmission, from the mobile communication device to the security server, of an indication that the requested authorization should proceed. In response, the second application receives, from the authentication server, a personal identification number (PIN). This PIN could be characterized as a network site login PIN or a transaction PIN, as applicable. The PIN preferably corresponds to a secret shared only by the security server and the network site, and not by the user. Most preferably, the PIN is derived also from other factors including that are unique to the EDA and, in the case of transaction authorization, particular transaction, etc. Irrespective of how the PIN is derived, the first application directs transmission, from the mobile communications device to the network site, of the PIN received by the second application, to authenticate the user or transaction to the network site.

Preferably, the second application stores the received PIN in a public data store, such as custom pasteboard, within the mobile communications device. In such a case, the first application retrieves the stored PIN from the public data store and the retrieved PIN is the PIN the first application directs transmission of to the network site. One unique advantage of this invention is its ability to use public shared storage, such as public pasteboards on the operating system on iPhones. However, alternatively the second application could simply transfer the received PIN directly to the first application. In this case, which may be advantageous in certain implementations, the first application has no need to retrieve the PIN and the PIN the first application directs transmission of to the network site is the PIN that was directly transmitted to it by the second application. Yet another alternative is for the second application to direct presentation of the PIN on the mobile phone device, e.g. on the iPhone touch screen, to the user. In this latter case, the user manual inputs the PIN to the first application, e.g. on the iPhone touch screen. Hence, in this later case the first application also has no need to retrieve the PIN and the PIN the first application directs transmission of to the network site is the PIN that was input to it by the second application. While this last case could potentially be beneficial in certain implementations, it is generally preferred that the transmission of the PIN to the network site by the first application is directed without the PIN being presented to the user, or input to the first application by the user.

According to still other preferred aspects of the invention, the public data store can also be used for other purposes. For example, the second application can store information in the public data store, which indicates either that an active session exist or does not exist between the second application and the security server. If so, after the first application receives a request of the user to access the network site or to enter into a transaction with the network site, the first application can determine, based on the stored active session information, whether or not an active session exist. The first application will only direct transmission of the request for authentication of the user to the security server only if it is determined that an active session exist. Otherwise, the first application will make a request that the user activate a session with the security server before further proceeding with the authorizing of the transaction.

Beneficially, the stored information indicating either that an active session exists or does not exist includes a random number and a time-to-live (TTL). In such a case, the second application receives a new random number and a new TTL from the authentication server, with the PIN it receives in response to the transmission of the indication that the requested authorization should proceed. The second application then stores, in the public data store, the new random number and the new TTL as current information indicating either that an active session exist or does not exist between the second application and the security server.

According to other advantageous aspects of the invention, the second application preferably also assists the user in logging into the security server. To do so, the second application receives a request of the user to login to the security server. This request could, for example, be initiated by the user by attempting to access the security server network site, e.g. the security server Internet website. The second application directs transmission of the request and a user identifier, e.g. the cell phone number of the iPhone, from the mobile communication device to the security server. A third application executing on the mobile communication device, such a text messaging application, receives a message, including another PIN, which might be characterized a security login PIN, from the authentication server in response to the transmitted request. The third application directs display of this other PIN by the mobile communication device. The second application receives another user input, for example entered on the iPhone touch screen, including the displayed other PIN. The second application directs transmission of the received other PIN from the mobile communication device to the security server. In response, the second application receives from the authentication server, a session cookie and active session information indicating a period of time during which the session between the second application and the security server will remain active. The second application stores (i) the session cookie in a private data store accessible only to the second application and (ii) the active session information in a public data store, e.g. the iPhone paste board, accessible to the second application.

According to other embodiments of the present invention, above described functionality may be implemented in one or more articles of manufacture including a program stored on some type of storage medium, such that the stored program is configured to be readable by a processor and thereby cause the processor to operate as substantially described above.

For example, the second application could be an iPhone app stored on iPhone memory that receives, from a security server, a request for authentication of the user in connection with either (i) the user logging into or (ii) the user entering into a transaction with a network site. If so, the app directs a display, by the mobile communication device, of the received request for authentication. If, in response, the app receives a user input to the mobile communication device indicating that the requested authentication should proceed, it directs transmission, from the mobile communication device to the security server, of an indication that the requested authorization should proceed. In response to this transmission, the app receives a PIN from the security server and makes the received PIN available to another program executable by the mobile communications device, for example by storing the received PIN in a public data store within the mobile communication device, to thereby facilitate transmission of the received PIN from the mobile communication device to the network site to thereby authenticate the user or the transaction to the network site. As noted above, the PIN will preferably correspond to a secret shared only by the security server and the network site, and not by the user.

The app preferably also causes the processor to store, in the public data store, information indicating either that an active session exist or does not exist between the app and the security server. In which case, the request for authentication is only received from the security server if the stored information indicates that an active session exist. If the stored active session information includes a random number and a time-to-live (TTL), the app also causes the processor to operate so as to receive, from the authentication server, a new random number and a new TTL with the PIN, and to store, in the public data store, this new information as the current information indicating whether or not an active session exist between the app and the security server.

The app beneficially will also cause the processor to operate so as to receive a request of the user to login to the security server, and direct transmission of the request and a user identifier from the mobile communication device to the security server. The app causes the processor to operate so as to also receive another user input, including another PIN, and to direct transmission, from the mobile communication device to the security server, of the received other PIN. The app then causes the processor to operate so as to, in response to the transmission of the received other PIN, receive a session cookie and active session information from the authentication server, indicating a period of time during which the session between the app and the security server will remain active, and store (i) the session cookie in a private data store accessible only to the app and (ii) the active session information in a public data store accessible to other programs executable by the iPhone.

In accordance with still another embodiment of the invention, a security server operates to authenticate a user of a mobile communication device by receiving, from a first application executing on the mobile communication device that is in an active session with a network site, a request for authentication of the user in connection with either (i) the user logging into or (ii) the user entering into a transaction with the network site. The security server transmits to a second application executing on the mobile communication device, the received request for authentication, and in response receives, from the second application, an indication that the requested authorization should proceed. In response, the security server then transmits, to the second application, a PIN, which preferably corresponds to a secret shared only by the security server and the network site, and not by the user, to authenticate the user to the network site. As noted above, this PIN could be characterized as a network site login PIN or a transaction PIN, as applicable. Also, the security server preferably receives the request for authentication of the user from the first application only if an active session exist between the second application and the security server.

According to other preferred aspects of the security server operations, the security server receives, from the second application, a request of the user to login to the security server. In response, the security server transmits, to a third application executing on the mobile communication device, preferably a text messaging application, a message including another PIN. This PIN might be characterized as a security login PIN, as noted above. The security server later receives the transmitted other PIN from the second application, and authenticates the user based on the received other PIN. The security server also transmits, to the second application, a session cookie and active session information indicating a period of time during which the session between the second application and the security server will remain active, based on the authentication of the user.

It may be worthwhile to highlight that there are may be three types of PINs. The first is the PIN required for initial activation of security application executing on the mobile communication device, i.e. the application that receives PINs from the security server. This PIN has sometimes been characterized as the security login PIN above. The second is a transaction signature PIN, which the network site application executing on the mobile communications device gets from the security application to authorize a transaction. This PIN has sometimes been characterized as the transaction PIN above. The third is a PIN the network site application gets from the security to login to the network site service itself. This PIN has sometimes been characterized as the network site login PIN above.

BRIEF DESCRIPTION OF DRAWINGS

FIG. 3 depicts a log of network activities that can be maintained and used for augmented risk intelligence analysis, in accordance with earlier extensions of our initial prior work.

PREFERRED EMBODIMENT(S) OF THE INVENTION

Overview

In prior work we have described how the introduction of a network based security server that has an independent channel to a user pop-up can be used in conjunction with a user's browser and the web site they are visiting to provide both web site and user authentication via a single user network device.

We then showed how to extend this concept to transaction authentication. Specifically, when a web site receives a transaction from a user browser, which it wishes to confirm, it sends the transaction information to the security server, which forwards the transaction information to the user pop-up along with a one time transaction signature which is computed based on a secret shared between the security server and the web server and on the transaction information. The user transfers this one time transaction signature to the web server via the browser, and the web server can recalculate the one time transaction signature, and if there is a match, can be assured that the user has confirmed the transaction.

We also showed how to extend the concept of a browser based pop up to different form factors. For instance the pop-up can be implemented as a smartphone app, as a dedicated part of a smartphone screen which is used only for this purpose, or it could be implemented as a smartcard.

We additionally showed how to take advantage of the fact that the pop-up (or its substitute) has a log of every user login and transaction. Currently risk engines watch user activity at a given web site to determine suspicious behavior. Or in some cases networks of web sites share such information. In other words data from the back-end systems is analyzed. In our system the pop-up's log of a user's login and transaction history provides a user centric front end way to capture this information and augment the capabilities of the risk engines.

Our Initial Prior Work

Figure 1:
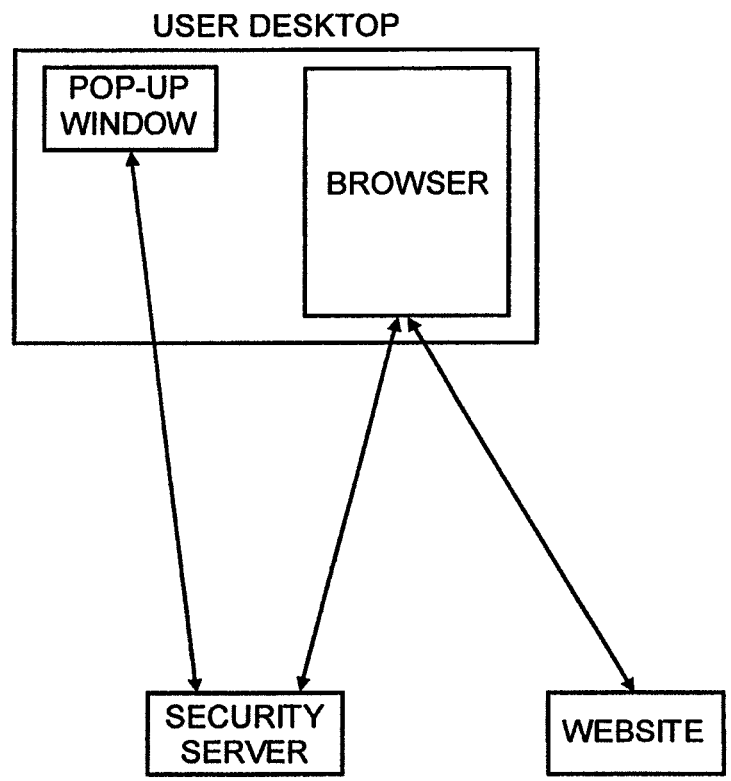
FIG. 1 depicts the main components of the system in accordance with our initial prior work.
Figure 2:
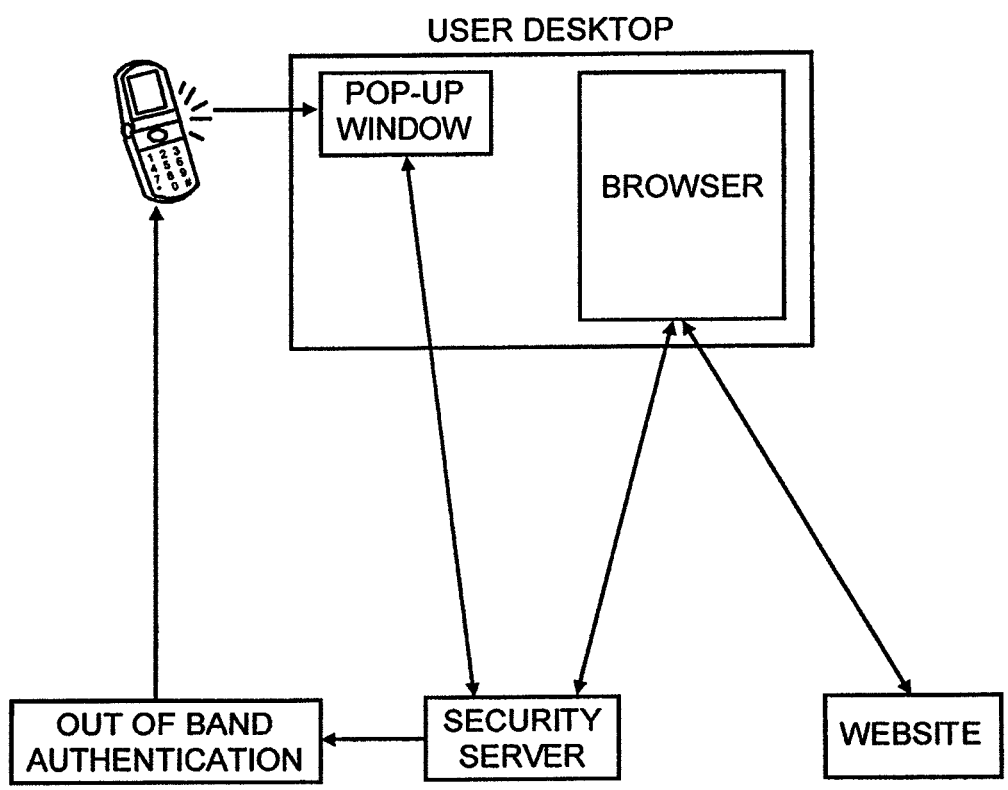
FIG. 2 shows the system augmented with user authentication, in this case achieved using out of band authentication, in accordance with our initial prior work.

We previously described a preferred embodiment for transaction authentication with reference to FIGS. 1 and 2, which show a system consisting of the following components:

A security server.
A pop-up window on the user's desktop.
A browser on the user's desktop.
The web site at which the user is performing the transaction.

As previously described, the user will first go through a set up and personalization phase which is a one-time process, and will then start up or activate the pop up using a technique such as out of band authentication. At this point the security server will have an active communication channel open to the user which it identifies by some user identifier, for instance the phone number used for out for band authentication. Further, the web site at which the user is transacting and the security server would have previously agreed on a shared secret.

The user using the browser selects a transaction, e.g. "Pay Alice $100", which is transmitted by the browser to the web server. The web server transmits this transaction to the security server via the user's browser. The security server computes a one time transaction signature as a function of (i) the transaction details and (ii) the secret it shares with that particular web site. The security server then transmits this one time transaction signature to the user's pop-up window. The user cuts and pastes or otherwise copies this one time transaction signature into the web browser and the signature is transmitted back to the web site. The web site independently computes the transaction signature using the (i) the transaction details and (ii) the secret it shares with the security server, and compares it with the one received from the user. If the two signature's match then the web server can be assured that the security server saw the same transaction it sent (i.e. not a transaction manipulated en route to the security server), and since the security server is showing the user the transaction in an independent channel, user confirmation of the transaction is obtained.

Previous Extensions of Our Initial Prior Work

In another previously described preferred embodiment, we showed how our earlier work regarding authentication, such as that described immediately above, can be extended to the case where the pop-up is implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the one time passwords used for authentication and would instead have to type them into the web browser operating on a different network device. These form factors provide additional layers of security simply by being independent of the user's desktop computer running the browser.

In either of the above referenced preferred embodiments, as a user performs multiple logins and transactions the pop-up or its substitute has the ability to store a history or log of these events. Such data can then be fed to risk management engines, which today only have access to patterns of user activity which they observe from one or more web sites.

In summary, in extensions to our earlier work, we showed how to significantly strengthen the binding between the user, the security server acting as an Identity Provider and the website which is the Relying Party in the case of transactions made over a network, such as the purchase of a product by a user at the website. Here, like in our earlier work, we assumed that the security server and the web site have a priori agreed on a shared secret (the system is easily extended to use public key cryptography). Additionally, as shown in FIG. 2, we also assumed that the user has used some method, for instance out-of-band authentication, to authenticate to the security server. When the user wishes to enter into a transaction at a website, such as the purchase of a product offered at the website or the transfer of funds from a bank account, the web site communicated transaction details (such as the type and amount of the transaction), which were presented both on a web page displayed to the user via the user's browser and on a pop-up window. Before proceeding with the transaction, the website required authentication and confirmation of the transaction, or what is commonly referred to as a signature of the user on the transaction. Therefore, the web page additionally displayed a blank for entry of the user's signature. Furthermore, the website also communicated a request for the user's signature on the identified transaction to the security server. The security server calculated a one-time-password as a function of (i) the secret it shares with the web site and (ii) the applicable transaction details displayed in the pop-up window, and displayed the one-time-password to the user in the pop-up window. The user entered (perhaps by cutting and pasting) this one-time-password onto the web page, which served as the user's signature on the transaction. The one-time-password, i.e. the signature, was then transmitted to the web site. The website confirmed the authenticity of the signature by re-computing the one-time-password from the secret it shares with the security server and the transaction details. Here again, this system has all the security properties of one-time-passwords, yet has the tremendous advantage that it does not require a shared secret with each user, and it is only the security server and the web sites that need shared secrets for the purpose of generating one-time-passwords used as signatures on transactions. The actual one-time-password can, if desired, also be constructed based on a time stamp or a counter based OTP algorithm (in the way we use these algorithms the time or counter value needs to be communicated by the security server to the web site; or potentially computed deterministically using some agreed upon formula).

Previous Further Extensions Our Prior Work

We also previously described a further extension that provides an application which allows the pop-up-window itself to reside on the user's smart phone, smart card or other small personal intelligent mobile network device, rather than on the network device, e.g. a desktop computer, being used to access the applicable website via its browser. We showed, for example, how this is easily accomplished on a smart phone because the phone is already personalized and, in accordance with the techniques described above, does not need to store a special secret or execute one-time-password software. Rather, only the website and the security server need share the necessary secret and only the security server need generate the one-time-passwords required for user authentication and user signature.

We also previously described an extension allowing us to provide augmented risk intelligence analysis. In this regard, conventional risk analysis relies on data from websites. However, because of the flow of information, we showed how a log of data, such as one of the type shown in FIG. 3, to capture the user's activities while the pop-up window was active can be easily maintained. The log could, for example, be maintained by the security server website, and the user can access this log. If desired the user or the security server can compute the user's risk profile. Additionally, or alternatively, the logged data can be forwarded to a third party risk engine, where it can be married with data received from websites visited by the user so that the risk engine can provide the user with an augmented risk intelligence analysis.

Figure 4:
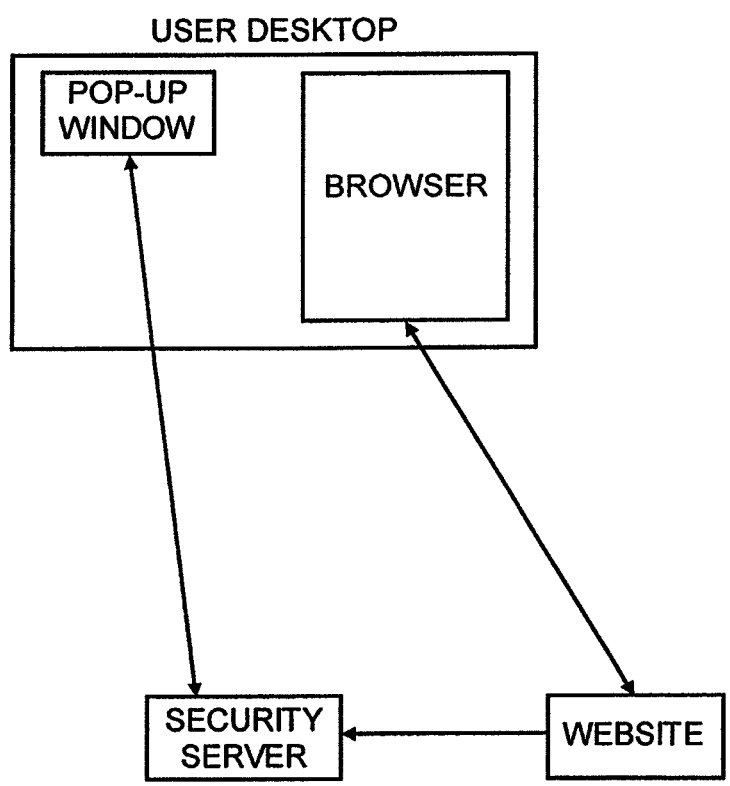
FIG. 4 depicts the main components of the system in accordance with earlier further extensions of our initial prior work.
Figure 5:
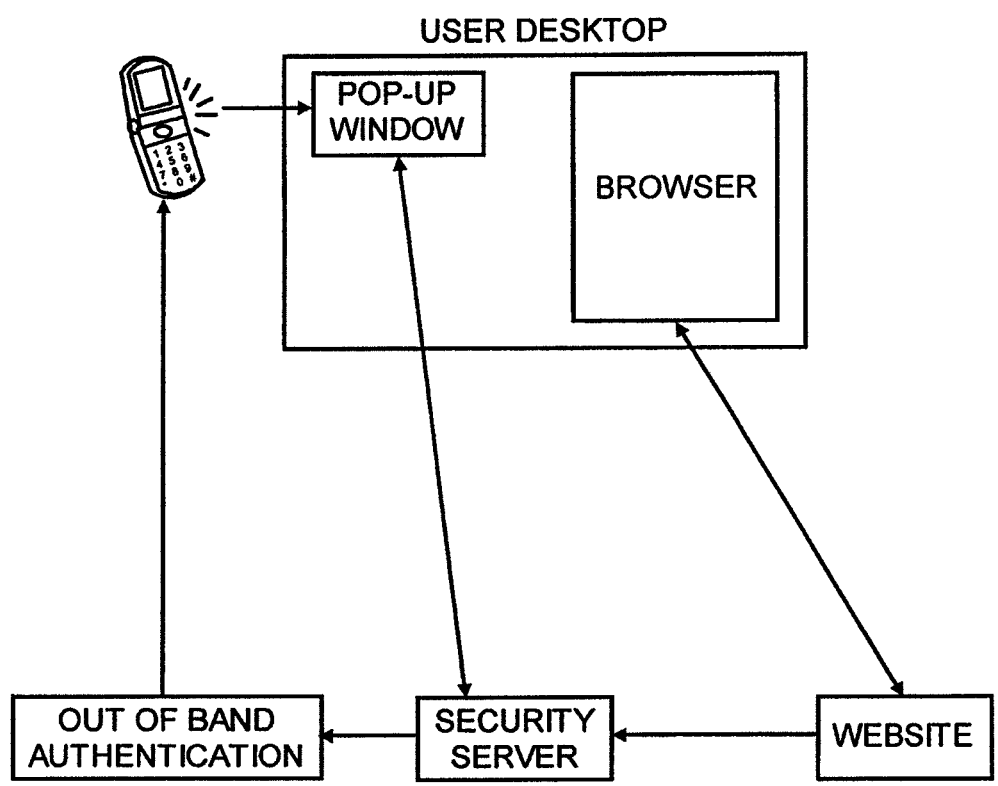
FIG. 5 shows the system augmented with user authentication, in this case achieved using out of band authentication, in accordance with earlier further extensions of our initial prior work.

In a still further extension, we described a preferred embodiment that allows for direct communications of authentication requests and transaction information between the website and the security server. More particularly, as described with reference to FIGS. 4 and 5, the user first went through a set up and personalization phase which is a one-time process, and then started up or activated the pop up using a technique such as out of band authentication. At this point the security server had an active communication channel or session open to the user which it identified by some user identifier, for instance the phone number used for out of band authentication. Further, the web site at which the user was transacting and the security server had a previously agreed on shared secret.

The user used the browser to select a transaction, e.g. "Pay Alice $100", which was transmitted by the user's browser to the web server. The web server transmitted this transaction to the security server via a direct link that had been established between the web site and the security server (rather than via the user's browser). The security server computed a one time transaction signature as a function of (i) the transaction details and (ii) the secret it shared with that particular web site. The security server then transmitted this one time transaction signature to the user's pop-up window. The user cut and paste or otherwise copied this one time transaction signature into the web browser and the signature was transmitted back to the web site. The web site independently computed the transaction signature using the (i) the transaction details and (ii) the secret it shared with the security server, and compared it with the one received from the user. If the two signature's matched then the web server was assured that the security server saw the same transaction it sent (i.e. not a transaction manipulated en route to the security server), and since the security server showed the user the transaction in an independent channel or session, user confirmation of the transaction was obtained.

We also previously described how the pop-up can be implemented in one of a variety of different form factors. One variety contemplated the pop-up window being on an application on a mobile device, another contemplated the window using a dedicated part of the display area of a personal mobile network device, such as a smart phone, and the last contemplated the pop-up window being embodied in dedicated hardware similar to that of a smartcard, which has communication capabilities. In all cases all functionality will work in exactly the same fashion, except that the user can no longer cut and paste the one time passwords used for authentication and would instead have to type them into the web browser operating on a different network device. These form factors provide additional layers of security simply by being independent of the user's desktop computer running the browser.

The Present Extensions of Our Prior Work

We now extend our previous work to IPhones™ and other more sophisticated smart mobile communication devices (which will be referred to below as Smart Phones or SPs). More particularly, we will describe and innovative protocol that uses a Modified Quasi-Out-Of-Band Authentication (MQOOBA) in lieu of the Quasi-Out-Of-Band Authentication (QOOBA) which we have previously described.

In accordance with the present protocol, a MQOOBA SP, e.g. iPhone or iPad, Application (which is commonly referred to the Hawk and Seal application and is often referred to below as the "Authentify™ Application" or "AA") eliminates the need and hence replaces QOOBA window. The AA can be used to:

1. To interact with other Smart Phone Applications (SPAs), such as on-line banking applications;
2. To supply personal identification numbers (PINs) for web browsing via an authentication system; and/or
3. As basis for mobile phone payments via a payment system.

Overview Description

We will now describe how the AA can be used to provide a secure payment method in conjunction with other SPAs, and without the other SPAs learning the user credentials to payment system. We will also show how the AA is easily integrated into an on-line banking application.

In the following example, the SP has the AA, and a sample application for the eDuckies store. The AA and eDuckies Application (EDA) are assumed not to multi-task in this example. Each have private storage no one else can see. The AA also has public storage any other SPA can see.

The user opens the AA and logs in, perhaps once a day. For example, either the user can enter his/her phone number, e.g. the phone number for the SP, or the AA can auto-fill in this information depending on the user's preference. Behind the scenes the AA talks to the authentication server (also sometimes referred to as a security server), which then issues a login PIN to the user via a short messaging service (SMS), which is now commonly referred to as a text messaging service.

The user receives the text message with the Login PIN and enters the received Login PIN into the AA. On some SP platforms, the AA can be configured, if so desired, to retrieve the PIN from the incoming SMS stream and auto fill the Login PIN in, making it even easier for users. A private equivalent of a session cookie is stored by the AA, and will be used by the AA for subsequent authentications to the authenticate server to obtain transaction PINs when available. The AA also communicates with SPAs using the most appropriate method. A unique advantage of this invention is the ability to use public shared storage, such as public pasteboards on the operating system on iPhones. The user is now logged in and a MQOOBA session is active. The user may now start using other SPAs and return to the AA when needed.

In this example, the user now browses the eDuckies Application or EDA, and eventually wants to place an order. eDuckies would like to get authorization of this order seamlessly. However, it would be insecure to let the user provide payment credentials to the EDA.

Accordingly, the EDA post the transaction to the authentication server, which here serves as the payments system. The EDA also asks the user to authorize the transaction at the AA. This is similar to a user being redirected to a payments web site, such as PayPal™ to authorize a transaction. The authentication server will post the transaction to the AA for presentation to the user.

Back at the AA, the user sees a transaction waiting, gets it, and sees that it looks legitimate. Accordingly, the user authorizes the transaction. It should be understood that MQOOBA makes it extremely difficult for an attacker, even one who somehow has placed a malicious eDuckies App on the user's phone, to be able to fake this. The MQOOBA PIN, is generated based on shared secret between authentication server and legitimate merchant site, such as eDuckies, and transaction information, etc. if applicable.

After the user authorizes the transaction at the AA, back at the EDA the user sees the PIN auto-filled in for them. Behind the scenes, the PIN was generated (using the transaction information provided by the EDA and the secret shared by the authentication server and eDuckies) by the authentication server, and transferred from the authentication server to the AA. The AA then transferred the PIN to the EDA on the user's SP using the shared storage. It should also be understood that, if desired, the user could be required to manually copy the PIN from the AA to the EDA instead of having the PIN auto filled in. In either case, after the PIN has been filled in on the EDA, when the user clicks "complete authorization", the EDA sends the PIN to the eDuckies web site. The eDuckies web service will re-compute the PIN and let the AA know if it was valid or not.

DETAILED DESCRIPTION

As discussed above, the AA gives a user dynamic login and transaction authorization PINs for particular merchant sites and for particular transactions. The AA can get these PINs from the authentication server web site, after having logged into it from within the AA.

In a nutshell:
1. The user logs onto the authentication server web site.
2. Thereafter, when the user is at a participating merchant site and needs to login or authorize a transaction, the user is asked to provide a new PIN.
3. The user then goes to the AA and it will show him/her the name of the merchant, and the transaction and provide him/her with the authorizing PIN for the transaction.

Figure 6:
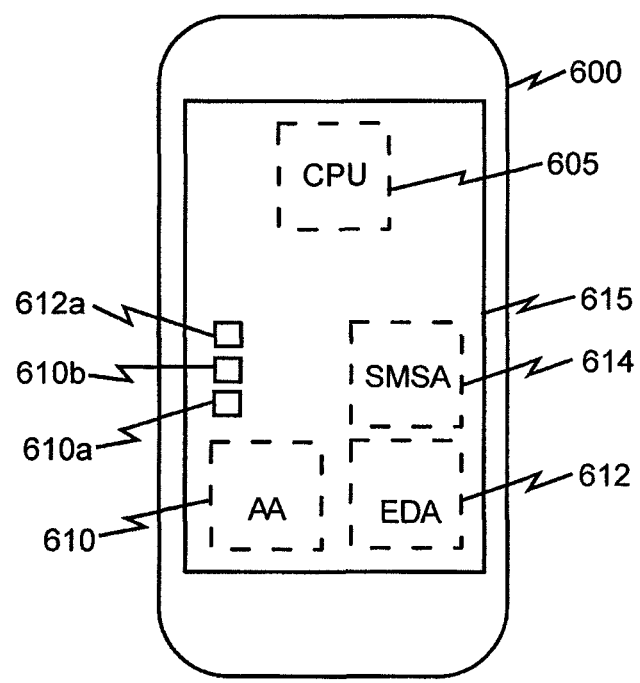
FIG. 6 depicts a smart mobile communication device in accordance with the present invention.
Figure 7:
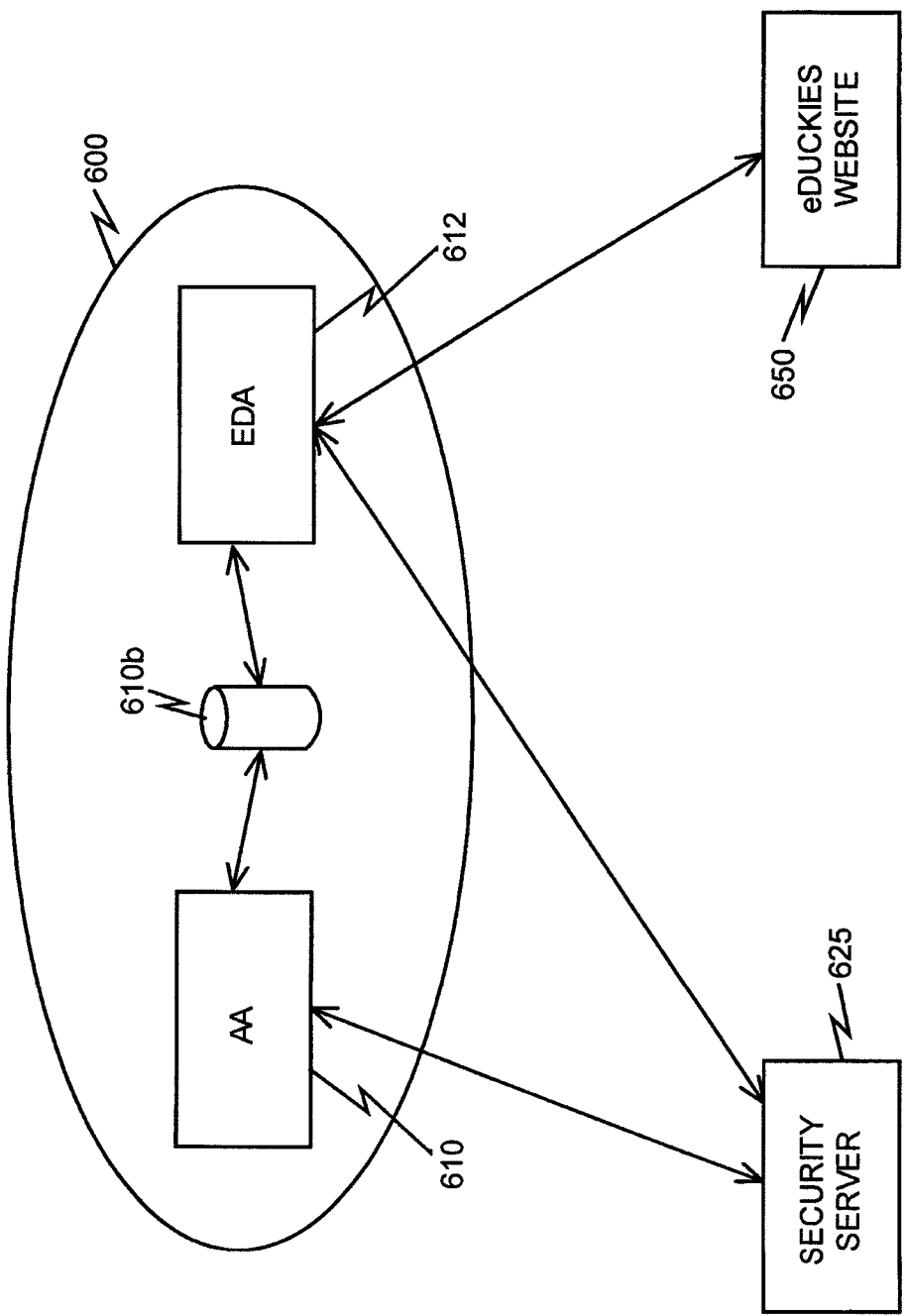
FIG. 7 depicts a simplified network architecture in accordance with the present invention.

Referring now to FIG. 6, an SP 600 is shown. The SP 600 includes a CPU 605 and display screen 615. The SP 600 also has various SPAs executable by the CPU 605 loaded therein, including the AA 610, EDA 612 and an SMS application (SMSA) 614 for text messaging. As shown AA 610 uses both public store 610*a* and private store 610*b*, and EDA 612 uses public store 612*a*. Referring to FIG. 7, the CPU 605 can execute the AA 610 to interact with the security server 625 and can execute the EDA 612 to interact with the eDuckies website 650 and the security server 625.

Initial Authentication Server Login

Figure 8:
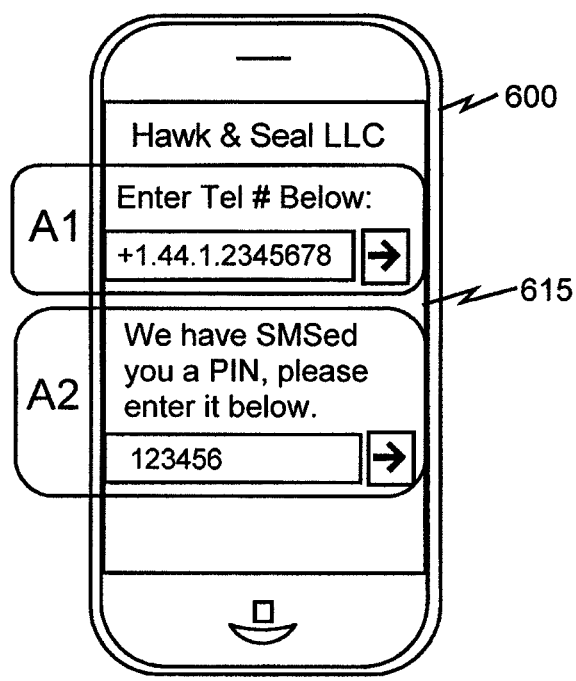
FIG. 8 depicts a display associated with an initial login, which is presented to the user on a smart mobile communication device by an authentication application being executed on that device in accordance with the present invention.

As shown in FIG. 8, when execution of the AA 610 is started, it causes the display of a logo in the area A1 of the display screen 615. The display in area A1 request a user identifier, such as the phone number, e.g. a cell phone number, associated with SP 600. Preferably the user has previously been allowed to select between a manual option, which if selected would require the identifier to be manually filled in by the user, and a automatic option, which if selected would serve as a directive to the AA 610 to pre-populate the space provided in the display in area A1 with the applicable user identifier, e.g. the cell phone number of the SP. (See, in the case of the IPhone, http://arstechnica.com/apple/news/2009/01/iphone-dev-user-phone-numbers.ars).

When the user clicks the arrow in area A1, the AA causes a post to authentication server 625. The authentication server 625 returns an acknowledgement indication to the AA 610 and, if the message was acknowledged, the AA 610 also causes the presentation of that shown in area A2 of the display screen 615 depicted in FIG. 7. As indicated in area A2, if success the authentication server 625 SMS, i.e. text, messages a PIN to the user at the user's SMS address. By activating execution of the SMSA 614 by the CPU 605, the user can access his/her SMS account and retrieve the PIN from the SMS message sent by the authentication server. The user then enters the PIN in the space provided in area A2, for example by cutting and pasting the PIN from the SMS message. After entering the PIN the user clicks on the arrow in area A2 and the AA 610 sends a second application programming interface (API) message to post the PIN.

As shown in FIG. 8, the return message from the security server 625, if success, returns a session cookie, a random number we call "nonce-login" and a time-to-live (TTL), and the AA 610 causes the display shown in area A3 of the display screen 615.

It should be noted that, rather than a choice just between manual and automatic fill, the user could additionally or alternatively be allowed to select or be required to enter a user name in the area A1 and a password in area A2. It should be understood that the choice between manual and automatic described above, is only one such choice described herein. Thus, another choice between manual and automatic will be described below in the context of transaction authorization and, more particularly, with respect to whether a different PIN, which is associated with a transaction authorization, is conveyed by the AA to EDA automatically or only after a manual input by the user.

Referring again to FIG. 6, the session cookie is stored privately, in private store 610*b*. The nonce-login and the TTL are stored publically on a custom pasteboard, the AA public pasteboard, which is created within the public store 610*a* (See, in the case of the IPhone, Custom Pasteboards Ref: http://developerapple.com/iphone/library/documentation/iPhone/Conceptual/iPhoneOS ProgrammingGuide/EventHandling/EventHandling.html#//apple_ref/doc/uid/TP4000707 2-CH9-SW28). When the user turns his/her 'focus' to the AA 610, the AA 610 always checks the nonce and TTL. If the TTL has timed out, the AA causes the display of that shown in area A1 of the display screen 615 of FIG. 8, to begin again the log-in to the authentication server 625.

Website Login and/or Transaction Authorization

Figure 10:
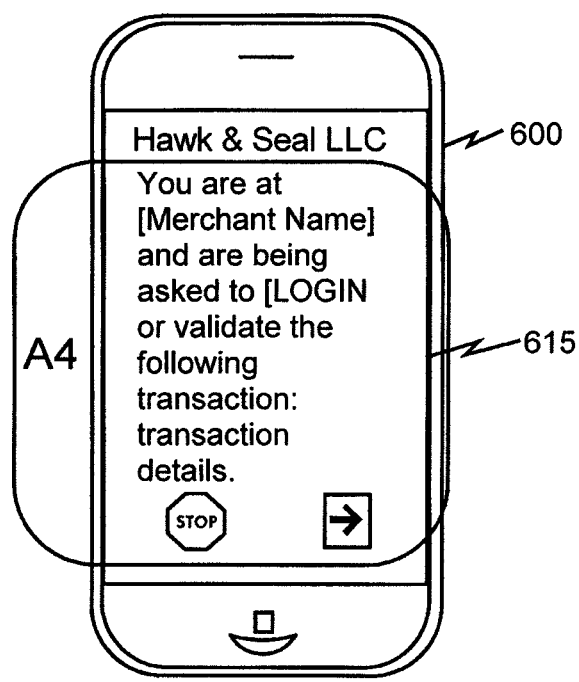
FIG. 10 depicts another display associated with the other login or the transaction authorization, which is presented to the user on a smart mobile communication device by an authentication application being executed on that device in accordance with the present invention.
Figure 11:
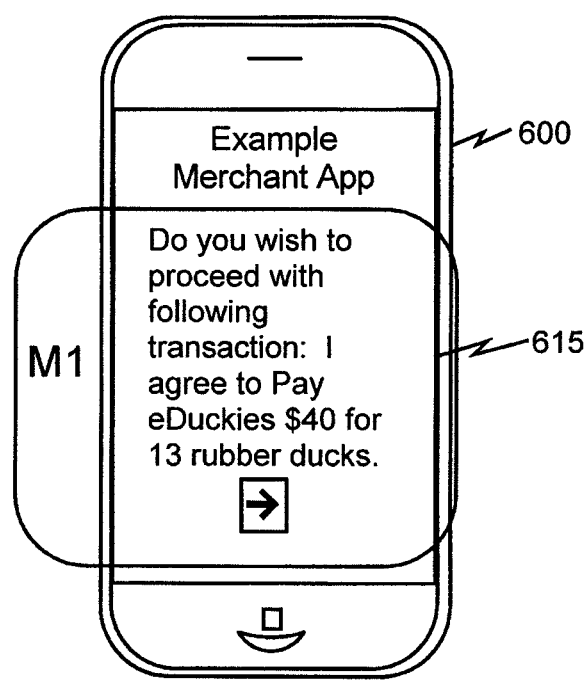
FIG. 11 depicts a display associated with transaction authorization, which is presented to the user on a smart mobile communication device by a merchant application being executed on that device in accordance with the present invention.

Turning again to FIG. 9, when the user is at some other SPA, e.g. the EDA, or web site and has been prompted for a PIN either for login or transaction authorization purposes, the user is redirected to the AA, as will be further discussed with reference to FIG. 11. For purposes of the description below, we will assume the user is at the EDA. In conjunction with this redirection, the EDA post information to the security server 625. This information includes whether the login or transaction authorization is requested, the name of the merchant, e.g. eDuckies, and, if transaction authorization is being requested, text of the transaction. If the security server has the ability to PUSH information to the AA, the security server 625 causes a post of this information to the AA. The AA 610 causes the display of either the information posted to it by the security server 625 in area A4 of FIG. 10, or what is shown in area A1 of FIG. 8 if re-login to the authentication server 625 is required. For purposes of this discussion, we assume area A4 is displayed.

Alternately, if the AA has no ability to PUSH, we rely on the user to PULL the data. This is the flow that is shown in the figures. When user clicks the arrow in area A3 of FIG. 9, the AA causes a post to the security server 625. The post includes the session cookie described above.

The security server 625 returns a success or failure message. The return message always returns a flag indicating login or transaction authorization, the name of the merchant, e.g. eDuckies, a new nonce-login, a new TTL and a PIN. If it is a transaction authorization it also returns the text of the transaction. If success than the AA causes the display shown in area A4 on the display screen A4 of FIG. 10.

Figure 9:
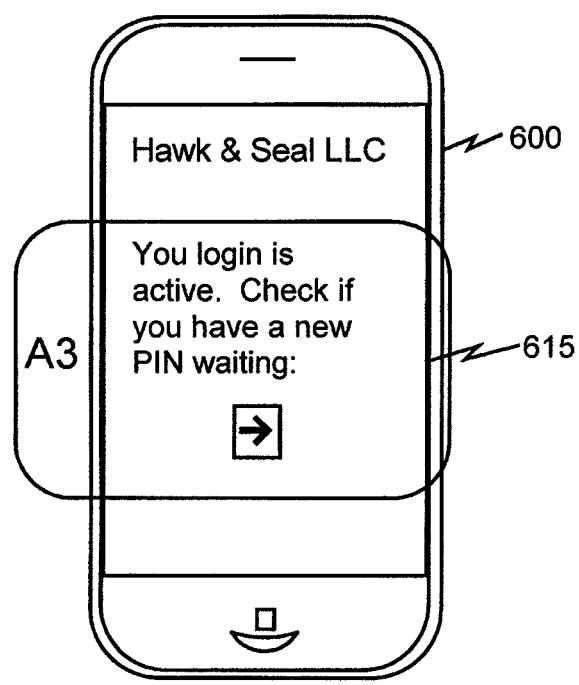
FIG. 9 depicts a display associated with another login or a transaction authorization, which is presented to the user on a smart mobile communication device by an authentication application being executed on that device in accordance with the present invention.

If the user clicks the stop sign, the user is directed back to screen shown in FIG. 9. Preferably an alarm is sent to the security server 625, to the EDA 612 and from there to the merchant website 650, and/or to some other security related website.

On the other hand, if the user clicks the arrow shown in area A4 of the display screen 615, the nonce-login and the TTL are written to the AA public pasteboard in public storage 610*a*. The login or transaction PIN, as applicable, is also written to the pasteboard, using the merchant identifier and PIN combination. The merchantid.PIN is written over any previous merchantid.PIN. The user is now again presented with the display shown in FIG. 9. Alternately if manual PIN transfer is the choice selected, then the user will be shown the PIN within the AA and the onus is on the user to copy it from the AA to the EDA.

It is perhaps worthwhile to reemphasize here that, in accordance with our earlier work described in greater detail above, the login or transaction PIN is generated by the authentication server 625 based on a secret shared by the authentication server and the website, and not shared with or known to the user. Furthermore, if transaction authorization is requested, the transaction PIN is generated by the authentication server 625 also using transaction information.

It should be noted that the EDA checks if there is a AA public pasteboard with a login-nonce with valid TTL for the user. If not, it informs the user that he/she does not appear to have logged into the AA. Here, we have assumed that the user has logged in and that the EDA has determined that the AA public pasteboard has a valid nonce.

Figure 12:
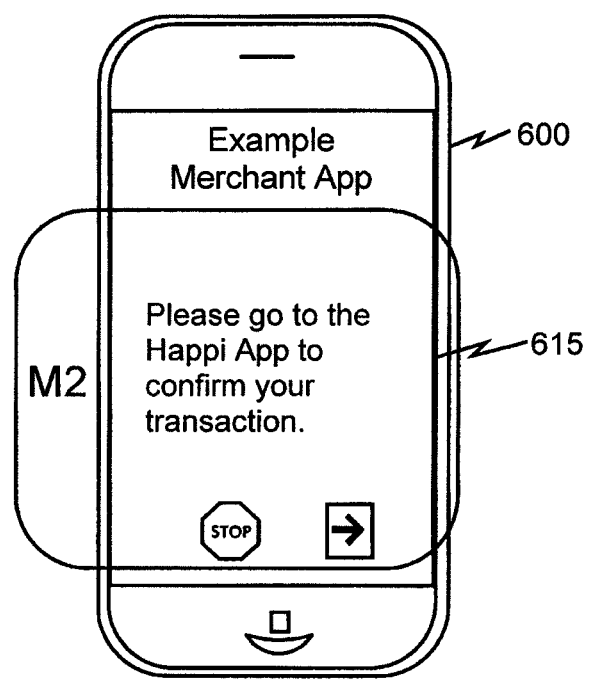
FIG. 12 depicts another display associated with the transaction authorization, which is presented to the user on a smart mobile communication device by a merchant application being executed on that device in accordance with the present invention.

For purposes of this description, we will assume that transaction authorization is involved. Turning now to FIG. 11, the user is at the EDA and is presented with the transaction information shown in area M1 of display screen 615. When the user clicks the arrow shown in area M1, he/she is redirected to the AA and the AA post the information relating to the merchant and transaction to the authentication server 625. The post includes the login-nonce. The security server 625 returns a success or failure. If success, then the AA presents the display shown in area M2 of the display screen 615 depicted in FIG. 12 to the user. If the user clicks on the arrow shown in area M2, the transaction authorization process described above is performed and the return message includes a string.

When focus returns to the EDA, the EDA polls the AA pasteboard to see if there is a new merchantid.PIN. Once the EDA locates it, it does a post to the eDuckies website of the STRING and the transaction authorization PIN. The website will return a success or a failure message, after it does its own verification of the PIN. It should be noted that if the manual PIN transfer option is chosen, the user must enter the transaction authorization PIN into the EDA.

What I claim is:

1. A method of authenticating a user of a mobile communication device, comprising:
   directing, by a first program executing on the mobile communication device, transmission, from the mobile communication device to a security server, of a request for authentication of the user in connection with either (i) the user logging into or (ii) the user entering into a transaction with a network site;
   receiving, by a second program executing on the mobile communication device, the request for authentication from the security server;
   directing, by the second program, presentation by the mobile communication device of the received request for authentication to the user;
   receiving, by the second program, a user input to the mobile communication device indicating that the requested authentication should proceed;
   directing, by the second program in response to the received user input, transmission, from the mobile communication device to the security server, of an indication that the requested authorization should proceed;
   receiving, by the second program from the security server, a personal identification number (PIN), in response to the transmission of the indication that the requested authorization should proceed; and
   directing, by the first program, transmission, from the mobile communications device to the network site, of the PIN received by the second program, to authenticate the user or transaction to the network site.

2. The method according to claim 1, further comprising:
   storing, by the second program, the received PIN in a public data store within the mobile communications device; and
   retrieving, by the first program, the stored PIN from the public data store;
   wherein the first program directs transmission of the retrieved PIN.

3. The method according to claim 2, wherein:
   the mobile communication device is a smart phone; and
   the public data store is a custom pasteboard.

4. The method according to claim 1, wherein the first program directs transmission of the PIN without the PIN being presented to, or input to the first program by, the user.

5. The method according to claim 1, further comprising:
   storing, by the second program in the public data store, information indicating either that an active session exist or does not exist between the second program and the security server;
   receiving, by the first program, a request of the user to access the network site or to enter into a transaction with the network site; and
   determining, by the first program based on the stored active session information, whether or not an active session exist;

wherein the first program directs transmission, from the mobile communications device to a security server, of the request for authentication of the user only if it is determined that an active session exist.

6. The method according to claim 5, wherein the stored information indicating either that an active session exists or does not exist includes a random number and a time-to-live (TTL), and further comprising:
receiving, by the second program from the security server, a new random number and a new TTL with the PIN, in response to the transmission of the indication that the requested authorization should proceed; and
storing, by the second program in the public data store, the new random number and the new TTL as current information indicating either that an active session exist or does not exist between the second program and the security server.

7. The method according to claim 1, wherein the PIN corresponds to a secret shared only by the security server and the network site, and not by the user.

8. The method according to claim 1, further comprising:
receiving, by the second program, a request of the user to login to the security server;
directing, by the second program, transmission of the request and a user identifier from the mobile communication device to the security server;
receiving, by a third program executing on the mobile communication device from the security server, a message including another PIN, in response to the transmitted request;
directing, by the third program, display, by the mobile communication device, of the other PIN;
receiving, by the second program, another user input including the displayed other PIN;
directing, by the second program, transmission, from the mobile communication device to the security server, of the received input other PIN;
receiving, by the second program from the security server, a session cookie and active session information indicating a period of time during which the session between the second program and the security server will remain active, in response to the transmission of the other PIN; and
storing, by the second program, (i) the session cookie in a private data store accessible only to the second program and (ii) the active session information in a public data store accessible to the second program.

9. An article of manufacture for authenticating a user of a mobile communication device, comprising:
non-transitory processor readable storage medium; and
a program stored on the storage medium, wherein the stored program is configured to be readable by a processor and thereby cause the processor to operate so as to:
receive, from a security server, a request for authentication sf the user in connection with either (i) the user logging into or (ii) the user entering into a transaction with a network site;
direct a display, by the mobile communication device, of the received request for authentication;
receive a user input to the mobile communication device indicating that the requested authentication should proceed;
direct, in response to the received user input, transmission, from the mobile communication device to the security server, of an indication that the requested authorization should proceed;
receive, from the security server, a personal identification number (PIN), in response to the transmission of the indication that the requested authorization should proceed; and
make available the received PIN to another program executable by the mobile communications device, to thereby facilitate transmission of the received PIN from the mobile communication device to the network site to thereby authenticate the user or the transaction to the network site.

10. The article of manufacture according to claim 9, wherein the stored program is further configured to cause the processor to operate so as to:
store the received PIN in a public data store within the mobile communication device so as to be available to the other program.

11. The article of manufacture according to claim 9, wherein the stored program is further configured to cause the processor to operate so as to:
store, in the public data store, information indicating either that an active session exist or does not exist between the stored program and the security server;
wherein the request for authentication is only received from the security server if the stored information indicates that an active session exist.

12. The article of manufacture according to claim 11, wherein the stored information indicating either that an active session exist or does not exist includes a random number and a time-to-live (TTL), and the stored program is further configured to cause the processor to operate so as to:
receive, from the security server, a new random number and a new TTL with the PIN; and
store, in the public data store, the new random number and the new TTL as current information indicating either that an active session exist or does not exist between the stored program and the security server.

13. The article of manufacture according to claim 9, wherein the PIN corresponds to a secret shared only by the security server and the network site, and not by the user.

14. The article of manufacture according to claim 9, wherein the stored program is further configured to cause the processor to operate so as to:
receive a request of the user to login to the security server;
direct transmission of the request and a user identifier from the mobile communication device to the security server;
receive another user input including another PIN;
direct transmission, from the mobile communication device to the security server, of the received other PIN;
receive, from the security server, a session cookie and active session information indicating a period of time during which the session between the program and the security server will remain active, in response to the transmission of the received other PIN; and
store (i) the session cookie in a private data store accessible only to the program and (ii) the active session information in a public data store accessible to other programs executable by the mobile communication device.

15. A method of operating a security server to authenticate a user of a mobile communication device, comprising:
receiving, from a first program executing on the mobile communication device that is in an active session with a network site, a request for authentication of the user in connection with either (i) the user logging into or (ii) the user entering into a transaction with the network site;
transmitting to a second program executing on the mobile communication device, the received request for authentication;

receiving, from the second program, an indication that the requested authorization should proceed; and transmitting, to the second program, a personal identification number (PIN), in response to the received indication that the requested authorization should proceed and to authenticate the user to the network site.

16. The method according to claim 15, wherein the security server receives the request for authentication of the user from the first program only if an active session exist between the second program and the security server.

17. The method according to claim 15, wherein the PIN corresponds to a secret shared only by the security server and the network site, and not by the user.

18. The method according to claim 15, further comprising:

receiving, from the second program, a request of the user to login to the security server;

transmitting, to a third program executing on the mobile communication device, a message including another PIN, in response to the received login request;

receiving, from the second program, the transmitted other PIN;

authenticating the user based on the received other PIN; and transmitting, to the second program, a session cookie and active session information indicating a period of time during which the session between the second program and the security server will remain active, based on the authentication of the user.

* * * * *